(12) United States Patent
Hyodo et al.

(10) Patent No.: US 6,522,936 B1
(45) Date of Patent: Feb. 18, 2003

(54) CONTROL APPARATUS, CONTROL METHOD, AND INTERFACE DEVICE FOR INFORMATION PROCESSING DEVICE

(75) Inventors: Tatsuya Hyodo, Kanagawa (JP); Shoichi Teshirogi, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/420,594

(22) Filed: Oct. 19, 1999

(30) Foreign Application Priority Data

May 21, 1999 (JP) .......................................... 11-141967

(51) Int. Cl.[7] .............................................. G05B 11/01
(52) U.S. Cl. .............................. 700/12; 700/17; 700/83
(58) Field of Search .............................. 700/17, 83, 84, 700/12, 286, 180; 710/5, 10, 305

(56) References Cited

U.S. PATENT DOCUMENTS

| | | | | |
|---|---|---|---|---|
| 4,511,918 A | * | 4/1985 | Lemelson .................... | 358/107 |
| 4,896,290 A | * | 1/1990 | Rhodes et al. ............... | 364/900 |
| 5,623,261 A | * | 4/1997 | Rose ........................... | 341/26 |
| 5,732,212 A | * | 3/1998 | Perholtz et al. .............. | 395/200.11 |
| 6,310,608 B1 | * | 10/2001 | Kaply et al. ................. | 345/168 |

FOREIGN PATENT DOCUMENTS

| | | |
|---|---|---|
| JP | 62-85323 | 4/1987 |
| JP | 2-89114 | 3/1990 |

* cited by examiner

*Primary Examiner*—Paul P. Gordon
(74) *Attorney, Agent, or Firm*—Staas & Halsey LLP

(57) ABSTRACT

A control apparatus according to this invention includes an ordinary information processing device, a control computer for controlling the information processing device, and an interface device interposed between the information processing device and the control computer in place of a human interface. A control unit of the control computer controls the information processing device on the basis of an unmanned control program and information from the information processing device. As an example, the control computer outputs a power supply ON/OFF-control data to ON/OFF-control the power source of the information processing device, or the control computer outputs key data to start a test program in the information processing device.

7 Claims, 6 Drawing Sheets

CONTROL APPARATUS, CONTROL METHOD, AND INTERFACE DEVICE FOR INFORMATION PROCESSING DEVICE

FIELD OF THE INVENTION

The present invention relates to a control apparatus, a control method, and an interface device for an information processing device for performing various control operations without performing a manual control operation to an information processing device such as a checking device. More particularly this invention relates to a control apparatus, a control method, and an interface device, for an ordinary information processing device, which perform unmanned control without refining the hardware and software of the information processing device.

BACKGROUND OF THE INVENTION

In recent years, in order to achieve energy saving and rationalization, a large number of computers, electronic machines, and the like having various functions depending on the specifications of works are introduced everywhere on manufacturing lines of factories, in a monitor room for monitoring communication failures, and in offices. As the functions of the computers, the electronic machines, and the like, performance evaluation for products, the displays of monitoring states, and the like are known. In addition, in an actual work using the computer or the like, an operator performs various operations, confirmation of display contents in an interactive mode through a human interface such as a keyboard, a mouse, and a display device. In this manner, in the control performed in the conventional interactive mode, at least various control operations performed by an operator are necessary. However, in recent years, to further advance energy saving and rationalization, research and development aiming at perfect-unmanned systems are being performed.

Computers, electronic machines, and the like automatically perform a great mass of a work which was used to be performed manually, and are installed everywhere to achieve energy saving and rationalization. In operating of the computers, the electronic machines, and the like, the following method is generally used. That is, an operator performs control operations through human interfaces such as a keyboard, a mouse, a display device, a speaker, and the like in an interactive mode.

Works performed by using computers or the like are roughly classified into four types of works.

(a) Program development work
(b) Regulated routine work for inputting different data
(c) Work for controlling other machine without operator
(d) Work in which exchange performed through human interface between operator and computer is regulated When the works described in item (a) to item (d) are performed, commercial software programs that have been highly standardized are used.

It is mentioned above that the works described in item (a) to item (d) are performed by commercial software programs. In order to further advance energy saving and rationalization, an achievement of a perfect-unmanned operation is also demanded in the works except for the work in item (c). The work in item (d) which rarely requires intelligent actions of an operator may be named as the work which most demands this.

In order to perfectly unman the work in item (d), software programs used in computers, electronic machines, and the like or hardware such as the computers, the electronic machines, and the like must be refined. However, a method of refining a software program is not practical because it is technically and legally difficult for a third party to refine a commercial software.

Therefore, as another method, a method of developing a dedicated software program without using a commercial software program may be used. However, development costs are very high for such a program. Development costs are high if refinement of hardware is considered. In addition, when the hardware and the software programs of conventional computers or electronic machines are refined, versatility is degraded.

A technique for automating/unmanning a work of visually checking check results displayed on a display is disclosed in Japanese Patent Application Laid-Open No. 62-85323. However, this technique requires a conventional device to refine hardware and does not solve the above problem.

SUMMARY OF THE INVENTION

The present invention has been made in consideration of the above circumstances. It is an object of this invention to provide a control apparatus, a control method, and an interface device for an information processing device, in which, without special refinement of an ordinary information processing device, unmanned control of the information processing device (computer, electronic machine, or the like).

According to a first aspect of the present invention, a control apparatus and an interface device are connected to the information processing device in place of a conventional human interface. When control information is read from the memory, this control information is converted by a signal converter into a predetermined code, and then input to the information processing device. Thus, the information processing device is controlled in accordance with the code. Analog data output from the information processing device is converted by an A/D converter into digital data and input to the control apparatus to be subjected to a predetermined process. As described above, according to the first aspect of the present invention, without special refinement for an ordinary information processing device, unmanned control of the information processing device can be performed, and energy saving and rationalization can be easily advanced. Further, by providing the A/D converter, analog data (e.g., image data, audio data, or the like) output from the information processing device can be handled as digital data which can be equally processed. Therefore, versatility can be improved.

According to a second aspect of the present invention, an interface device is interposed between a control apparatus and an information processing device in place of a conventional human interface. When control information is output from the control apparatus, the control information is converted by a signal converter into a predetermined code, and then input to the information processing device. Thus, the information processing device is controlled in accordance with the code. Analog data output from the information processing device is converted by an A/D converter into digital data and input to the control apparatus to be subjected to a predetermined process. As described above, according to the second aspect of the present invention, without special refinement for an ordinary information processing device, unmanned control of the information processing device can be performed, and energy saving and rationalization can be easily advanced. Further, by providing the A/D converter, analog data (e.g., image data, audio data, or the like) output from the information processing device can be handled as digital data which can be equally processed. Therefore, versatility can be improved.

According to a third aspect of the present invention, when an analog image signal is output from the information processing device, the analog image signal is converted by an A/D converter into digital data, and then subjected to a predetermined process in the control apparatus. As described above, according to the third aspect of the present invention, even if output information is an image in the information processing device, without special refinement for an ordinary information processing device, unmanned control of the information processing device can be performed.

According to a fourth aspect of the present invention, when the key input data is output from the control apparatus, the key input data is converted by a signal converter into a scan code, and then input to an information processing device. In this manner, the scan code is handled in the information processing device like a code output from a keyboard. Therefore, the information processing device is handled in the same manner as that in a keyboard input operation. According to the fourth aspect, as described above, since an operation related to a keyboard input operation by an operator is automatically performed, an operator is not necessary, energy saving and rationalization can be easily advanced.

According to a fifth embodiment of the present invention, when control information is output from the control apparatus, the control information is converted into a predetermined code, and then input to the information processing device. Thus, the information processing device is controlled in accordance with the code. When the response information is output from the information processing device, the response information is converted into digital data, and then input to the control apparatus to be subjected to a predetermined process. As described above, according to the fifth aspect of the present invention, without special refinement for an ordinary information processing device, unmanned control of the information processing device can be performed, and energy saving and rationalization can be easily advanced. Further, response information (e.g., image data, audio data, or the like) output from the information processing device can be handled as digital data which can be uniformly processed. Therefore, versatility can be improved.

Other objects and features of this invention will become understood from the following description with reference to the accompanying drawings.

DESCRIPTION OF THE PREFERRED EMBODIMENT

An embodiment of a control apparatus, a control method, and an interface device for an information processing device according to the present invention will be described below with reference to the accompanying drawings.

Figure 1:
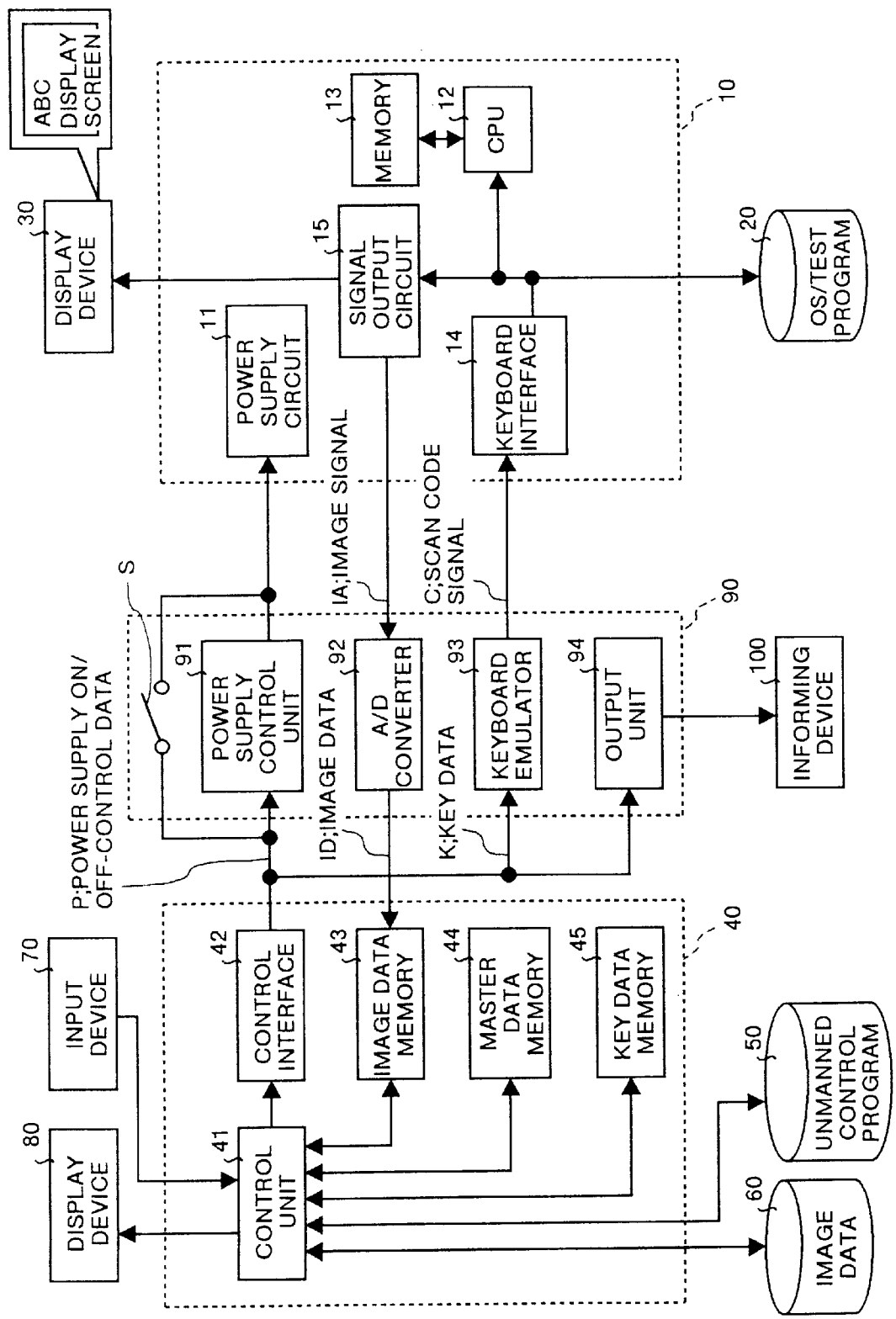
FIG. 1 is a block diagram showing the configuration of an embodiment of the present invention.

FIG. 1 is a block diagram showing an embodiment of the present invention. As shown in FIG. 1, according to this embodiment, the configuration is constituted by an information processing device 10 serving as an object to be controlled, a control computer 40 for controlling the information processing device 10 in place of an operator, and an interface device 90 which works as an interface between the information processing device 10 and the control computer 40. The information processing device 10 is generally controlled by an operator in an interactive mode through a human interface. This information processing device 10 is a computer, an electronic machine, or the like. More specifically, the information processing device 10 is a memory capacity check device installed on a production line for a personal computer, and checks the capacity of a memory 13 built in the personal computer.

A hard disk device 20 and a display device 30 serving as peripheral devices are connected to the information processing device 10. The hard disk device 20 stores an OS (Operating System) and a test program executed by a CPU (Central Processing Unit) 12. The OS is a program for controlling execution of the test program. The test program is a program for checking the capacity (packaged) of the memory 13 serving as an object to be checked. The display device 30 displays a check result (which is the memory capacity) or the like obtained by the memory capacity check. In the example shown in FIG. 1, a character string consisting of "ABC" is displayed on the display screen of the display device 30 as a check result.

A power supply circuit 11 in the information processing device 10 receives an external power and supplies the power to the respective sections of the device. The CPU 12 controls each sections of the device and checks the capacity of a memory (object to be checked) by execution of operating system and a test program. The memory 13 is packaged on the information processing device 10 in a check of the memory capacity.

The keyboard interface 14 works as an interface between a keyboard (not shown) and the CPU 12. This keyboard is used as a human interface between an operator and the information processing device 10. In this embodiment, in place of the keyboard, a keyboard emulator 93 is used. A signal output circuit 15 outputs an image signal supplied from the CPU 12 to the display device 30 to the outside of the device as an image signal IA.

The control computer 40 is a computer terminal for performing various controls and operations for the information processing device 10. The control computer 40 is constituted by a control unit 41, a control interface 42, an image data memory 43, a master data memory 44, and a key data memory 45. A hard disk device 50 and a hard disk device 60 are connected to the control unit 41 of the control computer 40 as external storage devices. In addition, an input device 70 and a display device 80 are connected to the control unit 41 as human interfaces.

The hard disk device 50 stores an unmanned control program executed by the control unit 41. This unmanned control program contains the order of operations performed to the information processing device 10 by an operator described in a program language. Here, the operation procedure performed by the operator is as follows. That is, the power supply of the information processing device 10 is turned on, a start command for the test program is input, a check result displayed on the display device 30 is recognized and determined, and the power supply of the information processing device 10 is turned off. The hard disk device 60 stores, as a bit map, an image data ID obtained by digitizing the image signal IA output from the signal output circuit 15.

The input device 70 is constituted by a keyboard, a mouse, or the like, and is used to input initial data and maintenance data to the control computer 40 and used in setting, changing, or the like of an operating order in the unmanned control program. The display device 80 displays an operation state of the control computer 40 or various data on the screen of the display device 80. In the control computer 40, the control unit 41 executes the unmanned control program to automatically execute the operations performed by the operator. The details of the operations of the control unit 41 will be described later. The control interface 42 works as an interface between the control unit 41 and an external device (interface device 90 in the example shown in FIG. 1).

The image data memory 43 is an image memory for temporarily storing the image data ID obtained by digitizing the image signal IA. The master data memory 44 is a memory for storing master data. The master data is a data corresponding to the information (image signal IA) output from the information processing device 10 to the outside.

This master data is data taught by an operator, and is set such that information (image signal IA or the like) generated by the information processing device 10 is assumed in advance. In this case, data represented by a data string "ABC" displayed on the display device 30 is stored in the master data memory 44 as master data. The master data is used in comparison with the information output from the information processing device 10 to the outside. The details of the comparison will be described later.

The key data memory 45 is a memory for storing key data. The key data representing a character string of keys related to a command input using a keyboard (not shown) connected to the keyboard interface 14 including a PN2 connector. More specifically, when a start command (RUN) for storing the test program stored in the hard disk device 20 is input, key-input operations are performed in the order named: press "R" key then press "U" key then press "N" key and press "ENTER" key. The character string data "RUN" and data representing "ENTER" key become the key data in this case.

In the same manner as described above, when an end command (END) for ending the OS (or a test program) is input, key-input operations are performed in the order named: press "E" key then press "N" key then press "D" key and press "ENTER" key. The character string data "END" and data representing "ENTER" key become the key data in this case. The key data described above are taught by the operator by using the input device 70 in advance, and are stored in the key data memory 45.

The interface device 90 is provided in place of the human interface (keyboard, mouse, power supply switch, or the like) conventionally provided in the information processing device 10. The interface device 90 has a bidirectional interface function between the control computer 40 and the information processing device 10. In the interface device 90, a power supply control unit 91 controls an ON/OFF-operation of the power supply to the power supply circuit 11 of the information processing device 10 on the basis of a power supply ON/OFF-control data P input from the control unit 41 through an RS232C connector or the like of the control interface 42. The interface device 90 has a not illustrated power supply unit built therein. The power supply control unit 91 has the function of a power supply switch which is conventionally arranged in the information processing device 10.

A switch S is used to form a bypass circuit in the power supply control unit 91. This switch S is turned on when the power supply unit is built in the power supply circuit 11, and it is turned off when the power supply unit is not built in the power supply circuit 11. More specifically, when the power supply unit is built in the power supply circuit 11, a power supply from the power supply unit of the power supply control unit 91 to the power supply circuit 11 is not necessary. For this reason, the switch S is turned on.

In the case described above, the power supply circuit 11 controls an ON/OFF operation of the power supply on the basis of the power source ON/OFF-control data P. On the other hand, the power supply unit is built in the power supply circuit 11, the switch S is turned off to supply a power from the power supply unit of the power supply control unit 91 to the power supply circuit 11. In the following description, it is assumed that the power supply unit is not built in the power supply circuit 11, and that the switch S is set in an OFF state.

An A/D converter 92 receives the image signal IA output from the signal output circuit 15 and digitizes the image signal IA as the image data ID. The image data ID is temporarily stored in the image data memory 43. The keyboard emulator 93 is generally an emulator having a function which is equivalent to a keyboard connected to the keyboard interface 14. The keyboard emulator 93 converts key data K (start command or end command) input from the control unit 41 through the control interface 42 into a scan code signal C to output the scan code signal C to the keyboard interface 14.

The key data K is the data stored in the key data memory 45. The scan code signal C is a signal adapted for scan code standards in the information processing device 10, and is generally the same as a signal input from a keyboard. Therefore, actually, the keyboard emulator 93 is connected to the keyboard interface 14. However, this configuration is electrically equivalent to the configuration in which a keyboard is connected to the keyboard interface 14.

Figure 2:
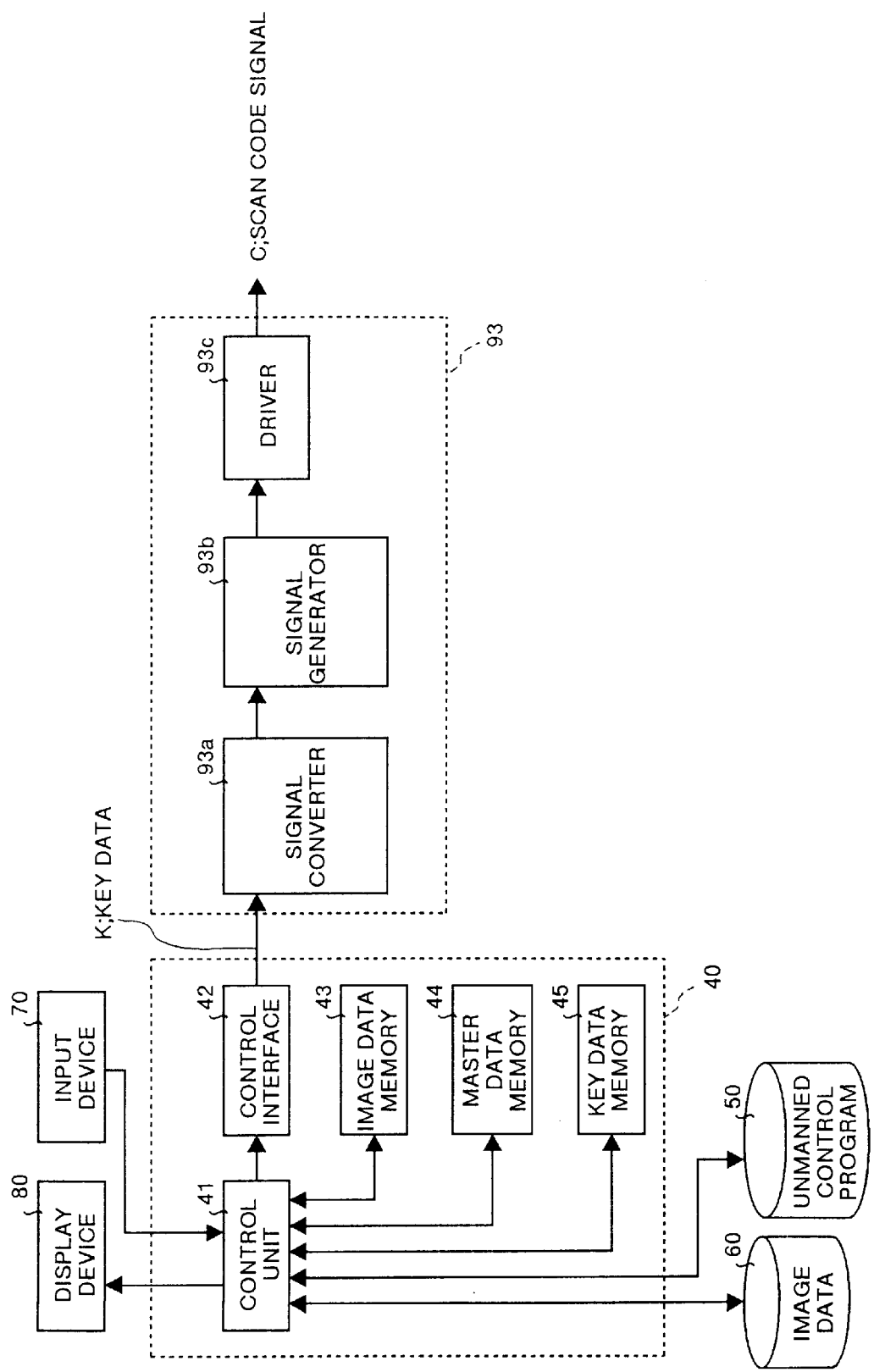
FIG. 2 is a block diagram showing the configuration of a keyboard emulator 93 shown in FIG. 1.

FIG. 2 is a block diagram showing the configuration of the keyboard emulator 93. In the keyboard emulator 93 shown in FIG. 2, a signal converter 93a converts the key data K into a signal having a logic level. A signal generator 93b generates a scan code signal C on the basis of an output signal from the signal converter 93a. A driver 93c outputs the scan code signal C to the keyboard interface 14 (see FIG. 1). Returning to FIG. 1, an output unit 94 outputs a signal related to a determination result or the like obtained in the control computer 40 to an informing device 100 (external device). This informing device 100 is a lamp, a buzzer, a printer, or the like, and informs an operator of the determination result or the like through light, sound, paper, or the like.

The configuration of a main part of the control unit 41 described above will be described below with reference to FIG. 3. The same reference numerals as in FIG. 1 denote the same parts in FIG. 3, and a description thereof will be omitted. In the control unit 41 shown in FIG. 3, a recognized portion extracting unit 41a extracts, as extracted image data, a portion (portion including character string "ABC" in FIG. 3) in which characters must be recognized from the image data ID stored in the image data memory 43. Here, the image data ID stored in the image data memory 43 is a data corresponding to a display screen of the display device 30 shown in FIG. 1.

A character recognizing unit 41b recognizes characters (character string "ABC" in FIG. 3) from the extracted image data extracted from the recognized portion extracting unit 41a. A comparator 41c compares master data stored in the master data memory 44 (see FIG. 1) with the recognized data recognized by the character recognizing unit 41b. A determining unit 41d determines, on the basis of a comparison result of the comparator 41c, whether the master data is the same as the recognized data or not.

Figure 4:
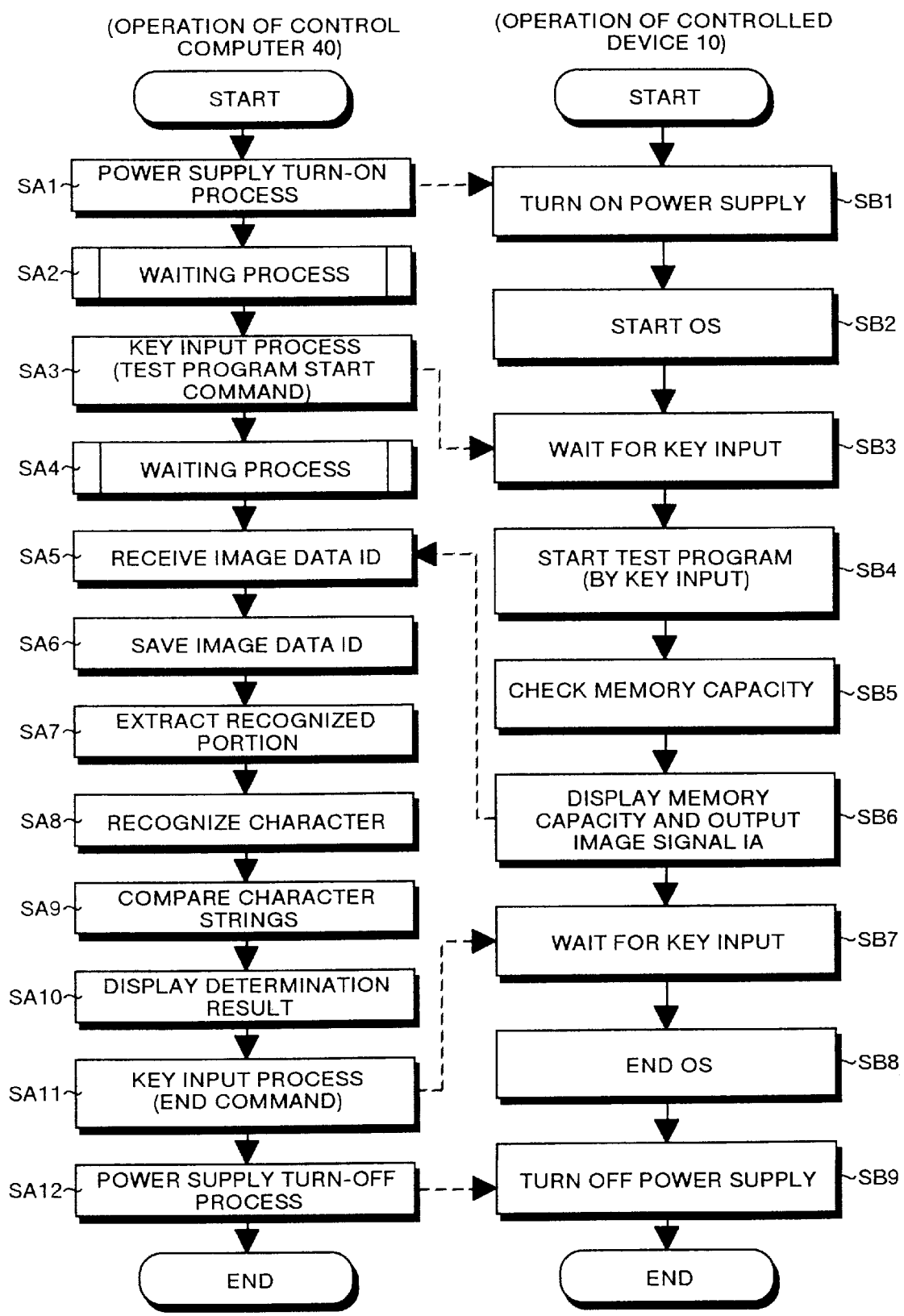
FIG. 4 is a flow chart for explaining an operation according to an embodiment of the present invention.

The operation of the embodiment described above will be described below with reference to FIGS. 4 and 5. In FIG. 4, steps SA1 to SA12 are steps related to the operation of the control computer 40, and steps SB1 to SB9 are steps related to the operation of the information processing device 10.

In step SA1, the control unit 41 of the control computer 40 outputs a power supply ON/OFF-control data P to the power supply control unit 91 through the control interface 42 to turn on the power supply of the information processing device 10. In this case, the power supply ON/OFF-control data P is a control data for designating a turn-on operation of the power supply.

When the power supply ON/OFF-control data P is input to the power supply control unit 91, a power is supplied from the power supply control unit 91 to the power supply circuit 11 to turn on the power supply in step SB1, and the power is supplied to the respective sections, i.e., the CPU 12, the memory 13, the keyboard interface 14, and the signal output circuit of the information processing device 10. In this manner, in step SB2 the CPU 12 starts the OS stored in the hard disk device 20 by an automatic program start function. In step SB3, the CPU 12 waits for a key input until a start command for designating the start of the test program is input.

Simultaneously with step SB2 described above, in step SA2, the control unit 41 executes a waiting process to wait until the OS is started. Here, the waiting process will be described below with reference to FIG. 5. In step SC1 shown in FIG. 5, the control unit 41 sets a wait setting time T as a waiting time WAIT. The wait setting time T is a time from when the start of the OS is started to when the OS is set in an operation enable state. In step SC2, the control unit 41 checks whether the wait time WAIT is "0". Because the wait time WAIT=T, the control unit 41 determines the determination result in step SC2 as "No".

In step SC3, the wait time WAIT is decremented by one. Then the control is returned to step SC2 to repeat the above processes. After the elapse of wait setting time T, i. e. when the wait time WAIT becomes "0", the control unit 41 determines the determination result in step SC2 as "Yes". In this case the control returns to step SA2 shown in FIG. 4. In step SA3, the control unit 41 outputs key data K corresponding to a start command for starting the test program from the key data memory 45 to the keyboard emulator 93 through the control interface 42. More specifically, the process in step SA3 generally corresponds to a key input operation.

After the keyboard emulator 93 converts the key data K (start command) into a scan code signal C, and then outputs the scan code signal C to the keyboard interface 14. The scan code signal C is input to the CPU 12 through the keyboard interface 14. In this manner, the CPU 12 in step SB4 starts the test program stored in the hard disk device 20 in accordance with the start command obtained from the scan code signal C. In step SB5, the CPU 12 starts checking the capacity of the memory 13 in accordance with the test program.

Figure 5:
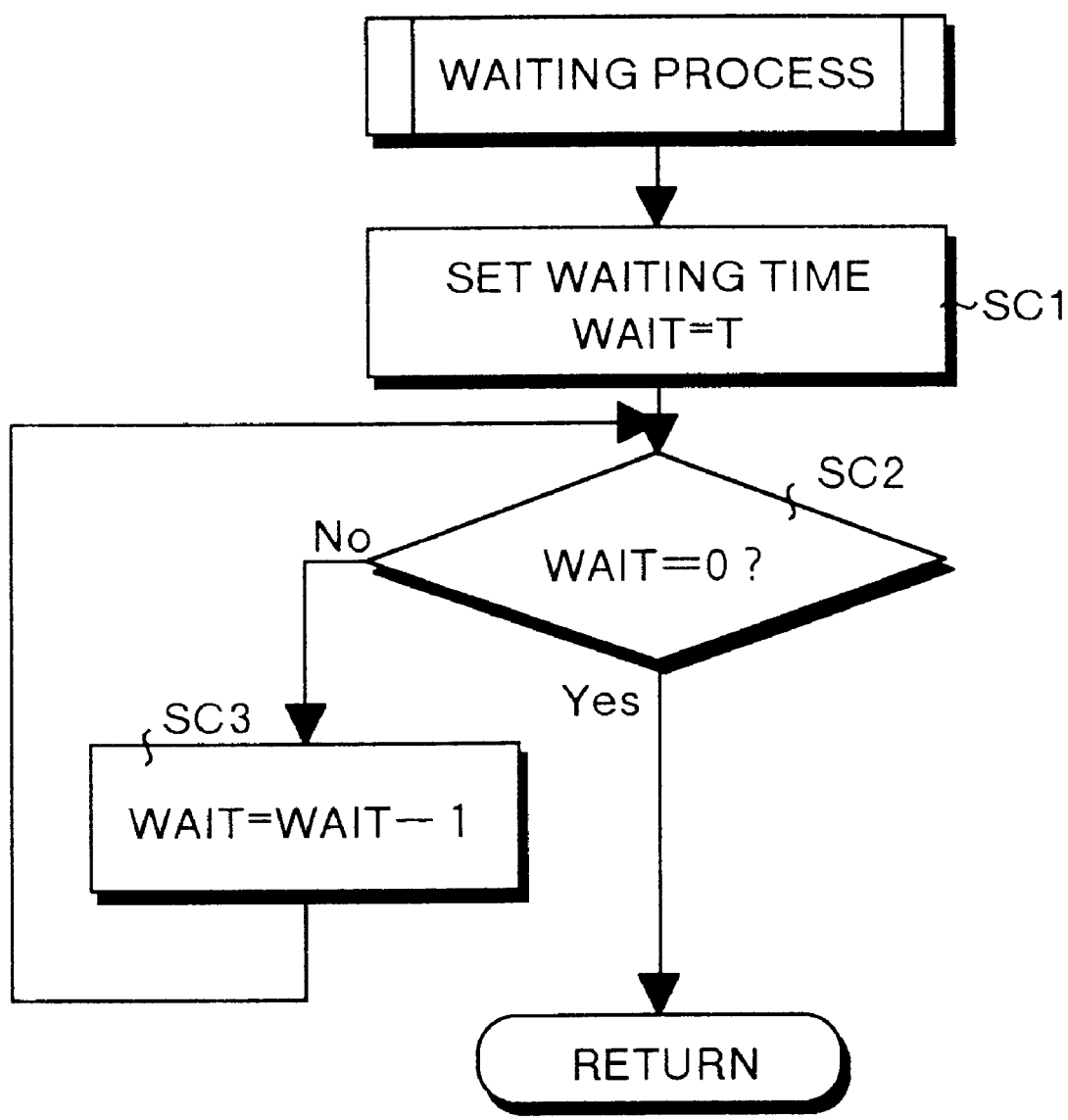
FIG. 5 is a flow chart for explaining a standby process shown in FIG. 4.

Simultaneously with step SB4 and step SB5 described above, in step SA4, as in step SA2, the control unit 41 executes the waiting process shown in FIG. 5. The control unit 41 waits until an image signal IA is output (step SB6) after the test program is started (step SB4). Exactly, the control unit 41 waits until the image data ID obtained by digital-converting the image signal IA is temporarily stored in the image data memory 43 after the test program is started. Thereafter, in this case, the wait setting time T set in step SC1 shown in FIG. 5 is a time required to store the image data ID in the image data memory 43 after the start of the test program.

In step SB5, when the capacity check of the memory 13 is finished, the CPU 12 shifts the control to step SB6. In step SB6, the CPU 12 outputs image data related to a check result (e.g., "ABC") of the memory capacity check to the display device 30 through the signal output circuit 15. In this manner, a character string "ABC" is displayed as the check result on the display device 30. In addition, in step SB6, from the signal output circuit 15, the image signal IA related to the check result ("ABC") is output to the A/D converter 92 of the interface device 90. In this manner, the image signal IA is converted by the A/D converter 92 into image data ID (digital data). The image data ID is stored in the image data memory 43. Here, in step SB7, the CPU 12 waits for a key input until an end command for designating the end of the OS (test program) is input.

Figure 3:
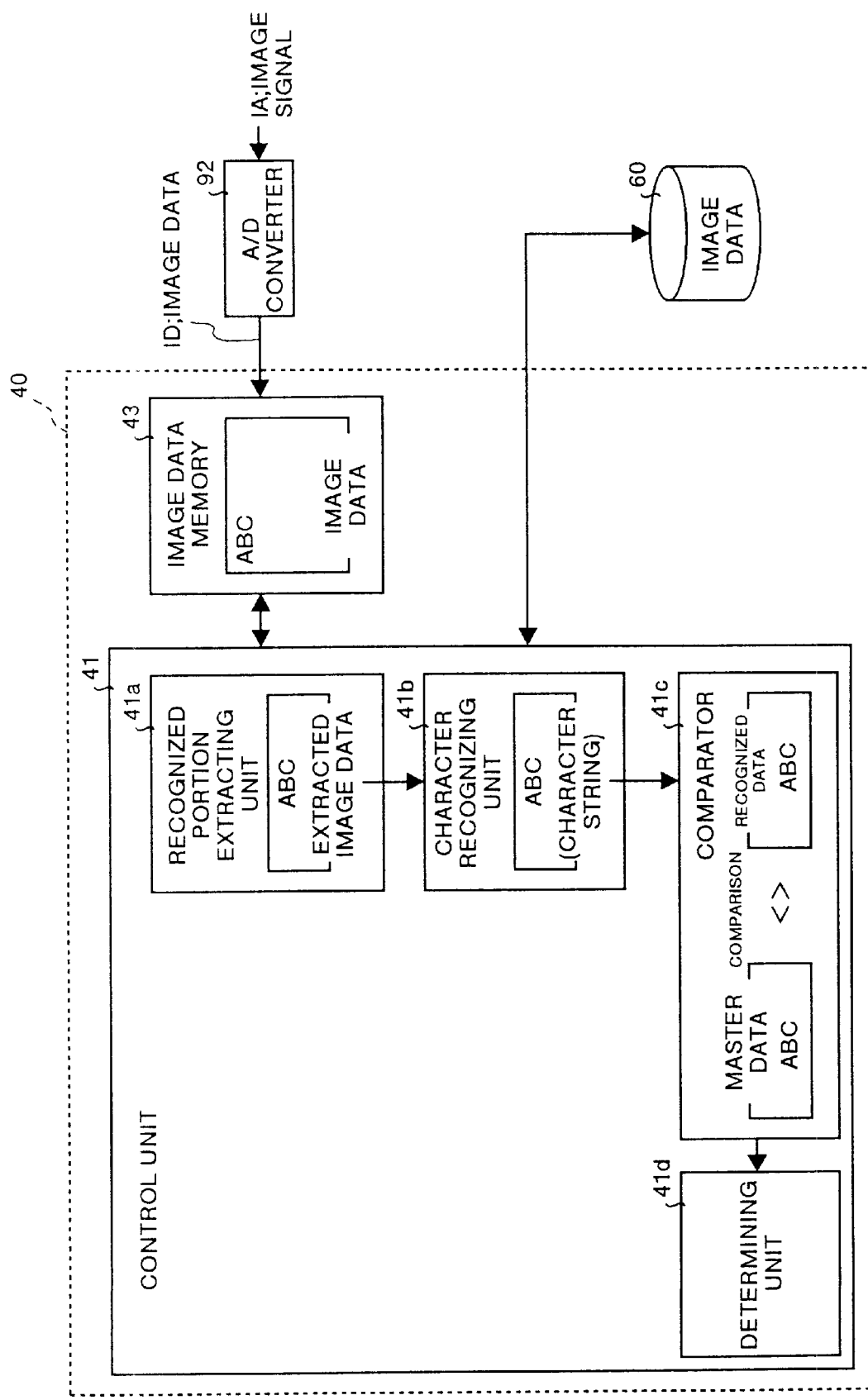
FIG. 3 is a block diagram showing the configuration of the principle sections of a control unit 41 shown in FIG. 1.

When the waiting process is finished in step SA4, the control unit 41 shown in FIG. 3 shifts the control to step SA5. In step SA5, the control unit 41 receives the image data ID converted by the A/D converter 92 from the image data memory 43. In step SA6, the control unit 41 stores the received image data ID in the hard disk device 60.

In step SA7, the recognized portion extracting unit 41a of the control unit 41 extracts a portion including the character string ("ABC") as extracted image data on the basis of the image data ID received from the image data memory 43. In step SA8, the character recognizing unit 41b recognizes characters in the portion (extracted image data) extracted by the recognized portion extracting unit 41a. In this case, the recognized data of the characters is a character string "ABC" (check result). Subsequently, in step SA9, the comparator 41c reads master data ("ABC") from the master data memory 44 (see FIG. 1), and then compares the master data ("ABC") with the recognized data ("ABC").

In step SA10, the determining unit 41d checks, on the basis of a comparison result in the comparator 41c, whether the master data is the same as the recognized data or not, and the comparator 41c performs display control for displaying a determination result. When the master data is the same as the recognized data, it means that the memory capacity of the memory 13 is equal to or higher than a critical level. When the two data are not equal to each other, it means that the memory capacity of the memory 13 is lower than the critical level.

When determination by the determining unit 41d is finished, the control unit 41 outputs a signal related to a determination result to the output device 94 through the control interface 42. In this manner, when a signal related to the determination result is output from the output device 94 to the informing device 100, the informing device 100 informs an operator of the determination result through light, sound, or the like. At the same time, the control unit 41 displays the determination result on the display device 80.

In step SA11, the control unit 41 outputs key data K corresponding to an end command for ending the OS (test program) from the key data memory 45 to the keyboard emulator 93 through the control interface 42. The process in step SA11 corresponds to a key input generally performed by an operator.

The keyboard emulator 93 converts the key data K (end command) into a scan code signal C, and outputs the scan code signal C to the keyboard interface 14. The scan code signal C is input to the CPU 12 through the keyboard interface 14. In this manner, the CPU 12 in step SB8 ends the OS (test program) in accordance with the end command obtained from the scan code signal C.

In step SA12, the control unit 41 outputs a power supply ON/OFF-control data P to the power supply control unit 91 through the control interface 42 to turn off the power supply of the information processing device 10, and then ends the process. In this case, the power supply ON/OFF-control data P is control data for designation of a turn-off operation of the power supply. When the power supply ON/OFF-control data P is input to the power supply control unit 91, the power supply control unit 91 stops power supply to the power supply circuit 11. In this manner, in step SB9, the power source is turned off.

As has been described above, according to the embodiment described above, when the interface device 90 having the function of a human interface and the control computer 40 operated in accordance with an unmanned control program representing an operating order are arranged for the information processing device 10, without special refinement (refinement for hardware or refinement for a software program) for the information processing device 10, unmanned control of the information processing device 10 can be performed.

Therefore, energy saving and rationalization can be easily advanced.

According to the embodiment described above, information (determination result in the example shown in FIG. 1) under control is informed by the informing device 100. Therefore, for example, if an abnormality occurs, an operator can know the abnormality. Therefore, the operator can quickly cope with the abnormality.

In addition, according to the embodiment described above, an unmanned control program (operating order) can be programmed by the input device 70 in accordance with the specification of the information processing device 10, unmanned control of a device having any specification can be performed regardless of the specification of the information processing device 10. Therefore, versatility is very high. Furthermore, according to the embodiment described above, since the power supply of the information processing device 10 can be ON/OFF-controlled by the control unit 41 and the power supply control unit 91, broad unmanned control including power supply control can be performed.

Although the embodiment of the present invention has been described with reference to the accompanying drawings, a concrete configuration is not limited to this embodiment. The present invention includes a change or the like in design of the invention without departing from the spirit and scope of the invention. For example, in the embodiment described above, the function may be realized by the following configuration. That is, an unmanned control program for realizing the function of the control computer 40 (and the interface device 90) described above is recorded on a recording medium 600 (shown in FIG. 6) which can be read by a computer, and the unmanned control program recorded on the recording medium 600 is loaded on a computer 500 shown in FIG. 6 and executed.

Figure 6:
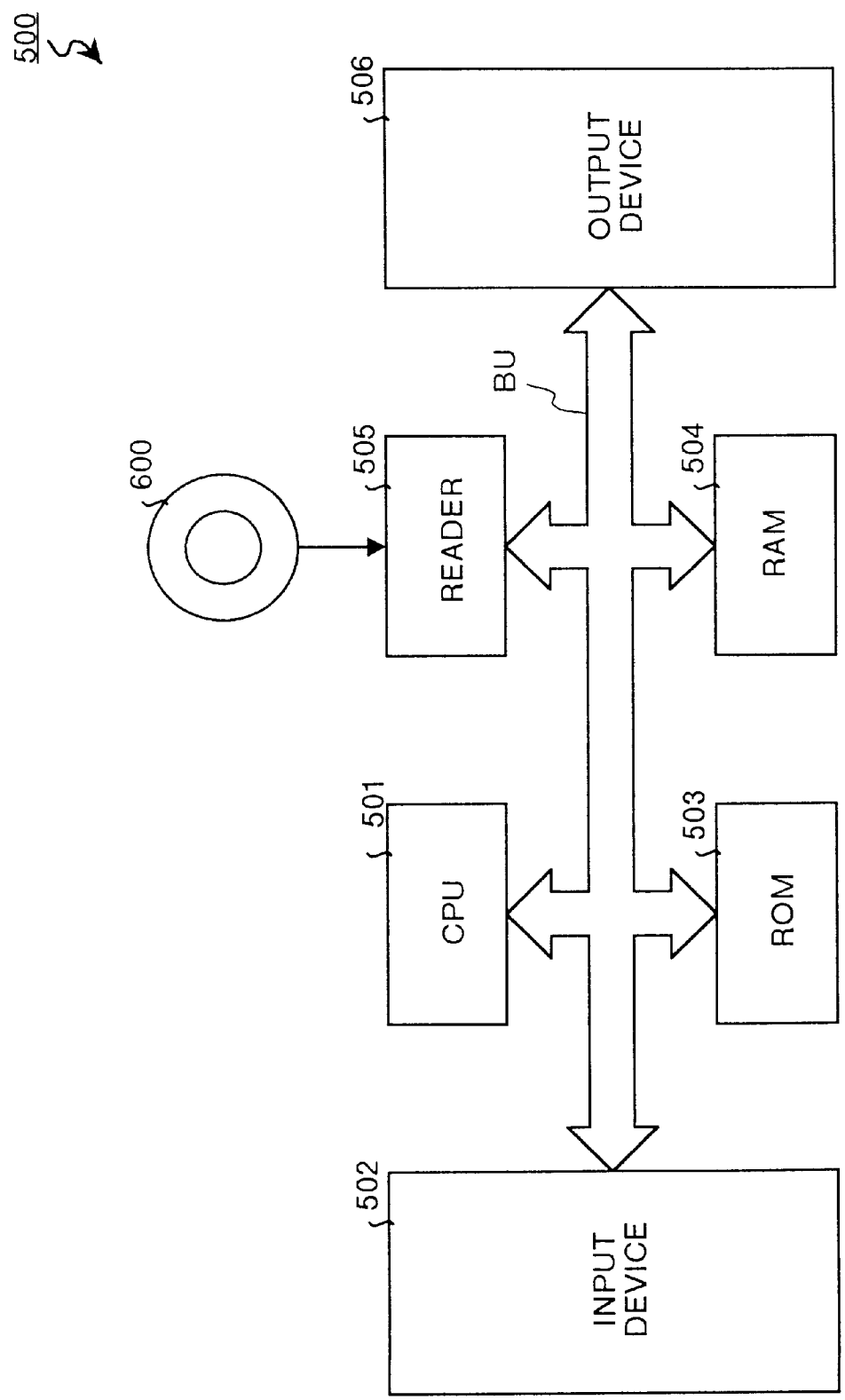
FIG. 6 is a block diagram showing a modification of an embodiment of the present invention.

The computer 500 shown in FIG. 6 is constituted by a CPU 501 for executing the unmanned control program, an input device 502 such as a keyboard or a mouse, a ROM (Read Only Memory) 503 for storing various data, a RAM (Random Access Memory) 504 for storing operation parameters, a reader 505 for reading the unmanned control program from the recording medium 600, an output device 506 such as a display or a printer, and a bus BU for connecting the respective sections of the device.

The CPU 501 reads the unmanned control program stored in the recording medium 600 through the reader 505, and the CPU 501 executes the unmanned control program to execute the processes described above. The recording medium 600 includes not only a portable recording medium such as an optical disk, a floppy disk, or a hard disk, as a matter of course, but also a transmission medium such as a network which temporarily stores and holds data.

In the embodiment described above, a memory capacity checking device has been described as an application. However, the present invention is not limited to the embodiment, and the present invention can also be applied to any information processing device which is operated by an operator through a human interface (keyboard, mouse, display device, or the like). Following may be named as examples of the information processing device.

(1) Evaluation/test/check device for products (devices or parts)
(2) Computer in computer center or the like
(3) Production line device operated on the basis of general-purpose application program
(4) Monitor device for monitoring faults (intermittent faults) or detecting problems
(5) Conventional production line device
(6) Computer on the whole, electronic machine on the whole In addition, in the embodiment described above, the image signal IA is exemplified as information output from the information processing device 10 shown in FIG. 1. However, the information is not limited to the image signal IA, and any signal such as a voice signal, an optical signal, voice, light, or an electromagnetic wave may be used. The voice signal and the optical signal are signals for driving a loudspeaker and a lamp, and are converted by the A/D converter 92 into digital data like the image signal IA.

Voice and light are emitted from a speaker and a lamp, respectively. In this case, a vibration—to—electricity converter and a light—to—electricity converter may be arranged in place of the A/D converter 92 to obtain a voice signal and an optical signal. Finally, when an electromagnetic wave is used, an antenna and a receiver may be arranged in place of the A/D converter 92 to obtain a received signal.

In addition, in programming of an unmanned control program, a measure which copes with a case wherein an unexpected information (image data ID or the like) is input is preferably considered. As the measure, an operator call using the informing device 100, a time out process, and a method of forcibly turning off the power supply of the information processing device 10 are known.

As has been described above, according to the first or second aspect of the present invention, without special refinement for an ordinary information processing device, unmanned control of the information processing device can be performed, and an advantage that energy saving and rationalization can be easily advanced can be achieved.

Further, by arranging an A/D converter, analog data (e.g., image data, voice data, or the like) output from the information processing device can be handled as digital data which can be uniformly processed. Therefore, versatility can be advantageously improved.

According to the third aspect of the present invention, even if output information is an image in an information processing device, an advantage that, without special refinement for an ordinary information processing device, unmanned control of the information processing device can be performed can be achieved.

According to the fourth aspect of the present invention, since an operation related to a keyboard input performed by an operator is automatically performed, an operator is not required, and an advantage that energy saving and rationalization can be easily advanced can be achieved.

According to the fifth aspect of the present invention, without special refinement for an ordinary information processing device, unmanned control of an information processing device can be performed, energy saving and rationalization can be easily advanced, and, by the second conversion step, response information (e.g., image data, voice data, or the like) output from the information processing device can be handled as digital data which can be uniformly processed. For this reason, versatility can be advantageously improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control apparatus for an information processing device, comprising:

a memory to store control information for said information processing device; and an interface device having a signal converter to convert the control information for said information processing device into a predetermined code, and an A/D converter to convert analog data output from said information device into digital data, wherein the control information includes data for controlling a turning on and off of a power supply to said information processing device and data for starting and ending a program to be executed on said information processing device.

2. The control apparatus according to claim 1, wherein said A/D converter converts an analog image signal output from said information processing device into digital data.

3. A control apparatus for an information processing device, comprising:

a memory to store control information for said information processing device; and an interface device having a signal converter to convert the control information for said information processing device into a predetermined code, and an A/D converter to convert analog data output from said information device into digital data, wherein said signal converter converts key input data output from said control apparatus into a scan code.

4. An interface device interposed between a control apparatus and an information processing device controlled by said control apparatus, comprising:

a signal converter to convert control information for said information processing device output from said control apparatus into a predetermined code; and an A/D converter to convert analog data output from said information processing device into digital data, wherein the control information includes data for controlling a turning on and off of a power supply to said information processing device and data for starting and ending a program to be executed on said information processing device.

5. The interface device according to claim 4, wherein said A/D converter converts an analog image signal output from said information processing device into digital data.

6. An interface device interposed between a control apparatus and an information processing device controlled by said control apparatus, comprising:

a signal converter to convert control information for said information processing device output from said control apparatus into a predetermined code; and an A/D converter to convert analog data output from said information processing device into digital data, wherein said signal converter converts key input data output from said control apparatus into a scan code.

7. A control method for controlling an information processing device, comprising:

converting control information for said information processing device output from a control apparatus into a predetermined code; and converting response information for the control information output from said information processing device into digital data, wherein the control information includes data for controlling a turning on and off of a power supply to said information processing device and data for starting and ending a program to be executed on said information processing device.

* * * * *